(12) United States Patent
Yao et al.

(10) Patent No.: US 11,004,584 B2
(45) Date of Patent: May 11, 2021

(54) ELECTRIC TRACK SYSTEM FOR VARIOUS APPLIANCES VIA MAGNETIC POSITIONING

(71) Applicants: Kang Yao, Delray Beach, FL (US); Nan An, Boca Raton, FL (US)

(72) Inventors: Kang Yao, Delray Beach, FL (US); Nan An, Boca Raton, FL (US)

(73) Assignee: Kang Yao, Delray Beach, FL (US)

( * ) Notice: Subject to any disclaimer, the term of this patent is extended or adjusted under 35 U.S.C. 154(b) by 0 days.

(21) Appl. No.: 16/163,040

(22) Filed: Oct. 17, 2018

(65) Prior Publication Data
US 2020/0126701 A1   Apr. 23, 2020

(51) Int. Cl.
| | |
|---|---|
| H01F 7/02 | (2006.01) |
| H02G 3/04 | (2006.01) |
| H02G 3/30 | (2006.01) |
| F21V 21/22 | (2006.01) |
| F21V 23/00 | (2015.01) |
| F21V 21/096 | (2006.01) |
| F21S 8/04 | (2006.01) |

(52) U.S. Cl.
CPC ............... *H01F 7/02* (2013.01); *F21S 8/043* (2013.01); *F21V 21/096* (2013.01); *F21V 21/22* (2013.01); *F21V 23/001* (2013.01); *H02G 3/0456* (2013.01); *H02G 3/24* (2013.01)

(58) Field of Classification Search
None
See application file for complete search history.

(56) References Cited

U.S. PATENT DOCUMENTS

| | | | | |
|---|---|---|---|---|
| 4,999,755 | A * | 3/1991 | Lin | F21S 2/00 362/217.02 |
| 5,259,774 | A * | 11/1993 | Gabrius | F21V 21/35 439/110 |
| 5,944,480 | A * | 8/1999 | Forrest | F03B 17/04 415/5 |
| 6,113,248 | A * | 9/2000 | Mistopoulos | F21V 23/06 362/219 |
| 6,334,602 | B1 * | 1/2002 | Clarke | A47G 1/1686 248/490 |
| D486,602 | S * | 2/2004 | Hines | D13/134 |
| 7,028,618 | B2 * | 4/2006 | Wallner | B66C 7/02 104/108 |
| 7,591,207 | B1 * | 9/2009 | Burkhardt | B25B 13/02 81/125 |

(Continued)

*Primary Examiner* — Xanthia C Cunningham (57) ABSTRACT

The present invention relates to an electric track system which can accommodate various appliance module using magnetic positioning. It supplements the missing functions of the current electric tracks, i.e., permitting the mixed use of the track-based fans and lights. This newly designed track can also be mounted to the wall for safe use of various electric appliances. The electric track system with magnetic positioning provides great flexibility, personal comfort and energy efficiency in both air circulation and room illumination for commercial and residential environments. With this system, various electric appliances can be mounted onto the track in a safe and quick way. A magnetic telescopic control rod is used to adjust the positions of the electric appliances in the ceiling-mounted track, like fans and lights. It brings safety and convenience to everyday life at affordable cost.

7 Claims, 13 Drawing Sheets

(56) References Cited

U.S. PATENT DOCUMENTS

| | | | | |
|---|---|---|---|---|
| 7,743,541 B2* | 6/2010 | Suciu | ................ | G09F 3/20 248/229.1 |
| 8,220,953 B1* | 7/2012 | Moore | ................ | F21S 8/04 362/217.01 |
| 8,418,980 B2* | 4/2013 | Wakura | ................ | G09F 7/18 248/320 |
| 8,556,463 B2* | 10/2013 | Wang | ................ | F21V 19/04 362/249.02 |
| 8,899,780 B2* | 12/2014 | Maxik | ................ | F21S 8/03 362/218 |
| 8,926,134 B2* | 1/2015 | Hast | ................ | F21V 19/001 362/249.03 |
| 9,220,178 B2* | 12/2015 | O'Connor | ................ | F21S 2/005 |
| 9,248,558 B1* | 2/2016 | Burkhardt | ................ | H01F 7/206 |
| 2001/0020429 A1* | 9/2001 | Serrano | ................ | B61B 13/00 104/91 |
| 2007/0285949 A1* | 12/2007 | Lodhie | ................ | H01R 25/142 362/648 |
| 2009/0078484 A1* | 3/2009 | Kocijan | ................ | B60L 13/04 180/167 |
| 2010/0271834 A1* | 10/2010 | Muessli | ................ | F21V 21/35 362/398 |
| 2011/0218697 A1* | 9/2011 | Goldberg | ................ | B61B 3/02 701/19 |
| 2013/0021791 A1* | 1/2013 | Hsu | ................ | F21S 4/20 362/217.13 |
| 2013/0097790 A1* | 4/2013 | Liao | ................ | A47L 1/02 15/88.4 |
| 2014/0036503 A1* | 2/2014 | Olsen | ................ | F21V 21/048 362/249.02 |
| 2015/0141092 A1* | 5/2015 | Murauyou | ................ | G06F 1/1681 455/575.8 |
| 2016/0018092 A1* | 1/2016 | Knaapen | ................ | F21V 29/70 362/235 |
| 2016/0033098 A1* | 2/2016 | Bergman | ................ | F21S 2/005 362/418 |
| 2016/0159585 A1* | 6/2016 | Wernersbach | ................ | B65G 54/02 198/617 |
| 2016/0252239 A1* | 9/2016 | Tremaine | ................ | H01R 25/14 248/49 |
| 2016/0363787 A1* | 12/2016 | Blum | ................ | G02C 5/008 |
| 2017/0205855 A1* | 7/2017 | Szeto | ................ | G06F 1/1656 |
| 2018/0023755 A1* | 1/2018 | Matthews | ................ | F16M 11/041 248/128 |
| 2018/0105396 A1* | 4/2018 | Purosto | ................ | B66B 7/044 |
| 2018/0127035 A1* | 5/2018 | Marleau | ................ | B62D 21/186 |
| 2018/0248498 A1* | 8/2018 | Piitulainen | ................ | H02P 25/064 |
| 2019/0045755 A1* | 2/2019 | Engelhardt | ................ | A01G 9/122 |

* cited by examiner

Side view of magnetic hook connecting the track roller

ELECTRIC TRACK SYSTEM FOR VARIOUS APPLIANCES VIA MAGNETIC POSITIONING

BACKGROUND OF THE INVENTION

Electric appliances such as ceiling fan and lighting are important parts of our lives. A reasonably installed ceiling fan and lighting adds comfort to everyday life and brings great energy efficiency. There have been various types of mounting plan for electric appliances such as ceiling fan and lighting. Among them, many use the track solution for a quick connection and adjustment in locations of these electric appliances. A well-designed electric-track should achieve the great function at an affordable cost. There have been different types of electric-track on the market which provide just convenience for quick installation of the lighting. Yet, ceiling fans have not been used in combination with lighting in the track system due to the design and cost. So, our invention solves this issue with a new approach via quick magnetic positioning.

Our electric track system enables quick light and fan connection via magnetic positioning. It provides great flexibility, personal comfort and energy efficiency in both air circulation and room illumination for commercial and residential environments. In our invention, electric track-based appliances such as fans and lights are magnetically attached to the track via the specially-designed magnetic hook and the track roller. They can be installed quickly in both cell-mounting and wall-mounting mode. A magnetic control rod is used to adjust the position of the electric appliances on the track in the ceiling-mounting mode. Our invention of an electric-track system via magnetic positioning solves a variety of problems facing the current tracks on the market. Such problems include installing the electric track on the wall and replacing lights and fans on the ceiling-mounted track. Prior to our invention, the electric tracks are only mounted in the ceiling due to the safety concern, i.e., the track contains naked metal strip for electric conductivity, which is easy to incur short-circuit or even an electric shock if mounted on the wall due to the human factor. With our lives electric track, the wires are embedded inside the track body made of insulative material, the chance of incurring any electric mishap is minimized. Also, with our creative use of the telescopic magnetic rod, one can replace the lights and fans in the ceiling-track safely and conveniently. Most of all, one can avoid the somewhat dangerous maneuvering on a ladder to reach the appliances mounted on the ceiling-track.

Track light system are disclosed in certain prior patents.

U.S. Pat. No. 3,801,951A shows a combination of an elongated track way and a mounting device for removably connecting an electric unit to the track. The track comprises an elongated channel member having a back wall and two side walls with a pair of corresponding in-turned flanges formed at the outer ends of the two side walls to present a lengthwise slot. An elongated insulating member is mounted within the channel which includes a pair of spaced apart receptacles in alignment with the lengthwise slot. A pair of conductors extend through each receptacle lengthwise of the channel. The mounting device is assembled in a hollow housing having an open end.

U.S. Pat. No. 5,154,509A shows that a low voltage track lighting system is provided wherein the track transmits current at 12 VAC to standard quartz halogen 12 volt lamps. The track may be made of interlocking components, namely; an electric strip made of copper tubes partially embedded in a flexible plastic member, and a metal bracket for attachment to a ceiling, wall, or other support. The attachment system between the track and a given fixture uses magnetic attraction, and wherein replaceable magnets in the mount of each fixture attach to the metal bracket of the track to hold the fixture in place and provide the force for contact with the electric strip. This is a new type of track yet it only fits 12 VAC appliance. The appliance in connected thru the receptacle on the track which is similar to the previous track system.

U.S. Pat. No. 8,348,492B2 shows a magnetic track and lighting system is described. The present magnetic luminaire attaches to a track through magnetic connectors and provides easy mobility of the luminaires on the track without necessary mechanical attachment mechanisms. The magnetic luminaire incorporates the utilization of LED sources and provides in its design cooling and heat dissipation by the interface between the magnetic luminaire and the track.

Compared with the prior arts in use, our invention is to provide a new track system that can connect with electric appliance via quick magnetic positioning and can handle a wide range of voltage, namely, from 12V or 220V, instead of just a low voltage such as the one mentioned in U.S. Pat. No. 5,154,509A. Compared to the prior art of ceiling-mounted tracks, our tracks can also be mounted on the walls, which makes it versatile and more efficient in consumers' daily lives.

Traditional electric track system requires mechanical mounting of the track module directly onto the track, i.e., inserting the receptacle module onto the track for connection. This requires two wide pieces of cooper or aluminum strip being built into the track rails for electric conductivity. Hence, this design involves certain risk of short-circuit or even electric shock if the two strips are mis-touched by accident. Because of this, this type of track is only installed onto the ceiling for safety purpose. Also, the current electric track is mainly designed for the use of lights. Other appliances such as the fans can not be connected to the track easily and safely.

To solve this problem, we come up with a new track system where the micro-fan can be used in combination with track lighting fixtures for a variety of reasons. First, ceiling fan requires substantial support and motion stabilization to support the weight of the ceiling fan as well as the forces arising when the ceiling fan is rotating. Track lighting fixtures do not provide sufficient holding strength to support and control such forces. Second, many track lighting fixtures use only low voltage lamps which requires power conversion from standard line voltages. Ceiling fans, on the other hand, utilize standard line voltages. Thus, it is a dilemma to accommodate both the lights and the fans on to the current electric tracks.

Our innovative track system optimizes the use of electricity since the energy-efficient appliance such as the track-based micro-fan only consumes small wattage of power. Above all, our electric track system use the magnetic attraction to secure the various appliances in the ceiling track. There are preset slots on the track to house the track-roller where the appliance is connected thru the magnetic hook. Our special track design enables the simple and reliable quick connection between the electric appliances and the track. Instead of the exposed conductive metal strips, we embed the wires inside the insulating track rails to prevent any short-circuit or electric shock from happening. The track roller is made with two wheels where the electric contact points are located and the electric contact is established only when the wheels sit inside the track slot thru the magnetic attraction between the metal pc and the magnets embedded into the wheels of the track roller. Our system is compact in design and safe to use. It is convenient to operate and can be made at very efficient cost since the expensive conductive metal strips are spared. Thanks to the simplicity in design and manufacturing, it provides multi-function convenience and great comfort to consumers.

SUMMARY OF THE INVENTION

The object of the present invention is to provide an electric track system for light, fans and other electric appliances that can be mounted onto both ceiling and wall environment in private or commercial residence. The electric track system comprises:

(1) two track rails that carry the embedded wiring and the built-in slots for track roller;

(2) a plurality of magnetic track rollers each containing two wheels and each wheel containing a magnet for positioning into the track slot, where the electric connection is established;

(3) a plurality of track-based electric appliance modules comprising a magnetic hook and an electric appliance such as light and fan etc.;

(4) a telescopic magnetic rod to control the position of the appliance module mounted on the ceiling track.

The electric track system provides convenience and flexibility for quick-installation of the appliance and adjustment of its position on the track. This great feature for convenience and flexibility is achieved thru the magnetic attraction between the track and the track roller where the appliance module is located.

Figure 1:
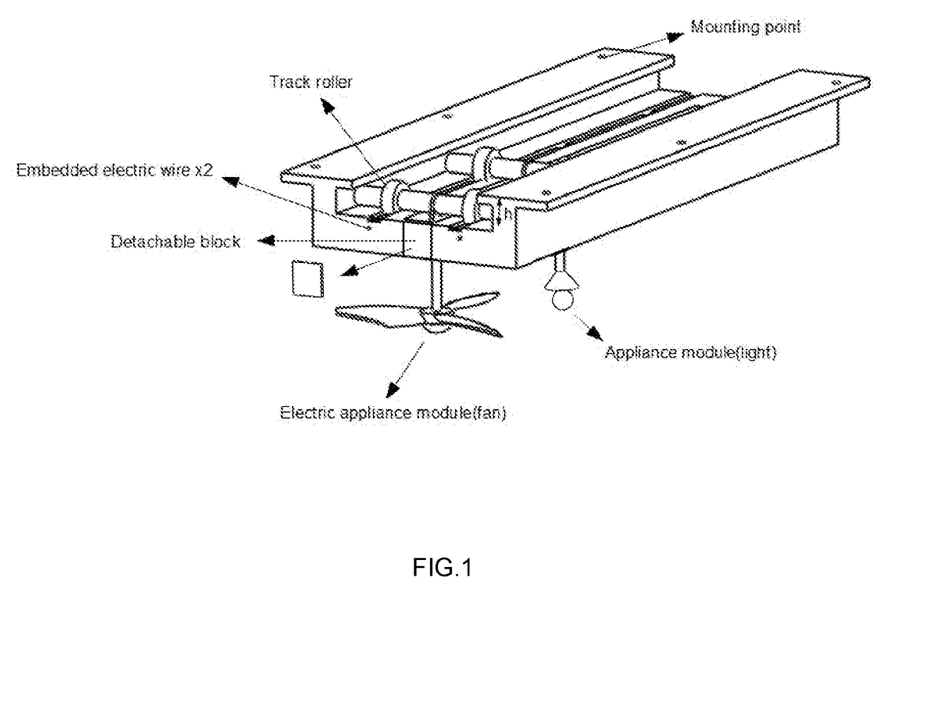
FIG. 1 shows a perspective view of an electric track system with track roller sitting inside the track slot.

As shown in FIG. 1, the ceiling-mounted electric track can be anchored by fasteners through the sets of mounting points. There are several slots in the track rail for connecting the track roller with the magnetic wheels. The track roller can travel on the track till it settles into the slot via magnetic attraction, thus establishing the electric connection for the appliance module which is hooked onto the track roller. The electric wires are embedded inside the track rails and connects at the contact points inside the track slot. When the roller sits inside the slot via the magnetic attraction, an electric connection is safely established. A detachable block is adopted for quick connection between the electric appliance and the track via the magnetic hook.

As shown in FIG. 1, h stands for the clearance between the track roller and the ceiling. The clearance of h should be enough for mounting the hook onto the track roller without the ceiling interference. An electric appliance module is then connected to the track roller. Vice versa, the magnetic hook needs to be taken off first from the track roller in order to uninstall an appliance module.

Figure 2:
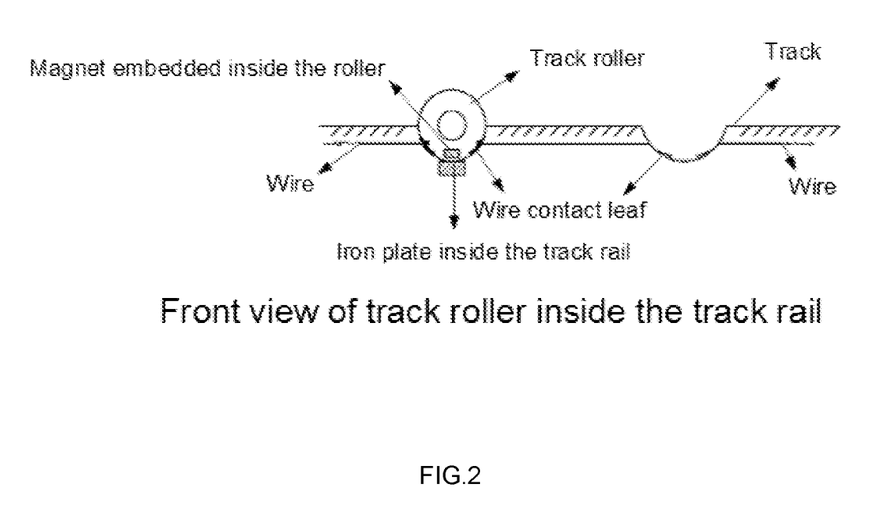
FIG. 2 shows a front view of track roller sitting inside the track rails.
Figure 3A:
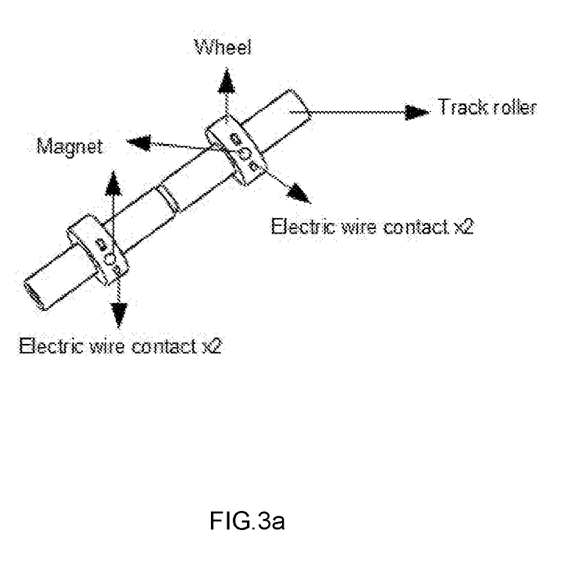
FIG. 3a shows a perspective view of track roller with two magnetic wheels.
Figure 3B:
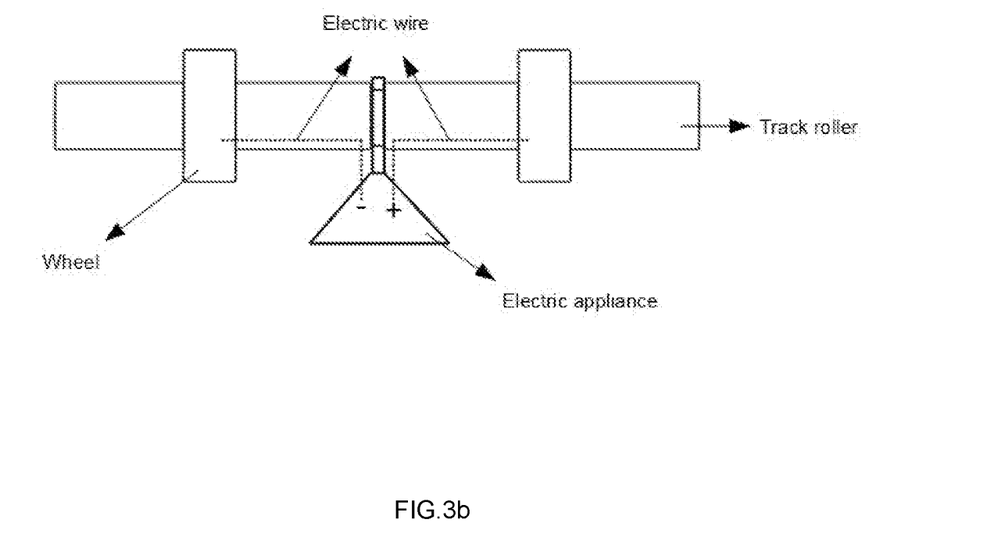
FIG. 3b shows a plane view of the electric wires inside the track roller.
Figure 4A:
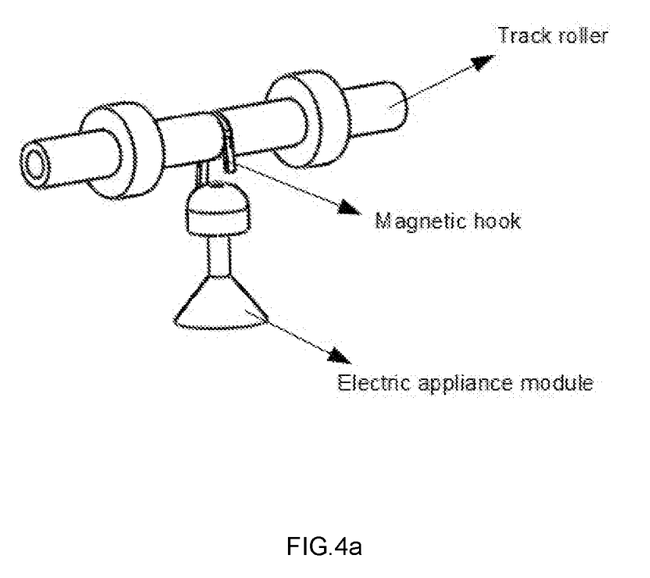
FIG. 4a shows a perspective view of magnetic connection between electric appliance and track roller.
Figure 4B:
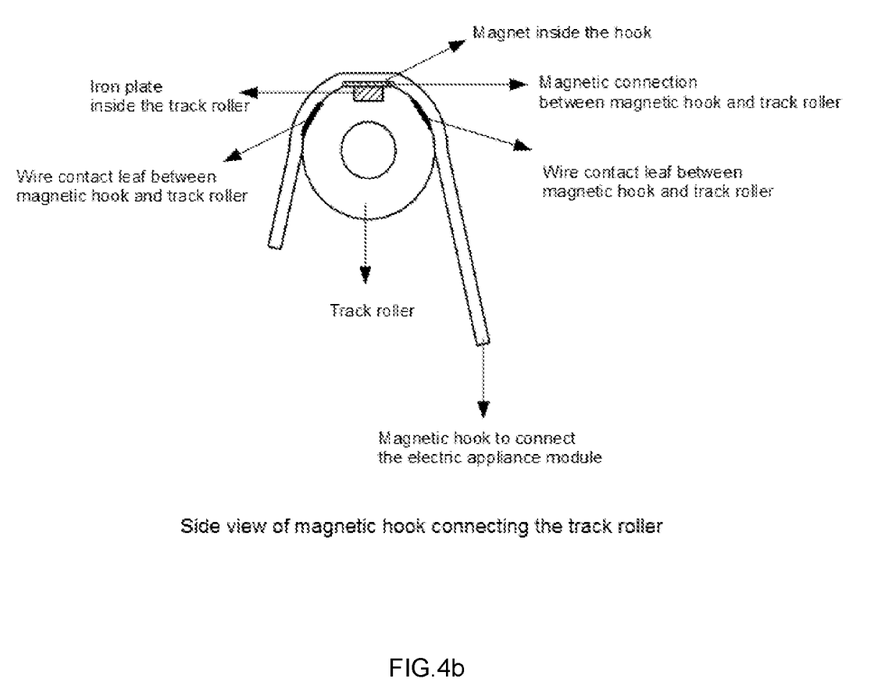
FIG. 4b shows a side view of magnetic hook connected to the track roller.

FIG. 2 shows a front view of a track roller sitting inside a track slot. Two electric wires embedded in the track roller are pressed onto the two contact leafs embedded inside the track slot via magnetic attraction thus establishing the electric connection. In FIG. 3a, magnets are embedded inside the two wheels to form a magnetic track roller. Two electric wires are embedded inside each wheel of the track roller. In FIG. 3b, it shows a plane view of the magnetic track roller connecting the electric appliance. The electric wire connects the electric appliance from the track roller. In FIG. 4a, the electric appliance module connects the magnetic track roller by the magnetic hook with magnetic attraction. FIG. 4b shows a side view of magnetic hook connecting the magnetic track roller. The embedded magnet inside the hook is attracted to the metal piece embedded inside the track roller when the electric appliance module is placed on the roller.

Figure 4C:
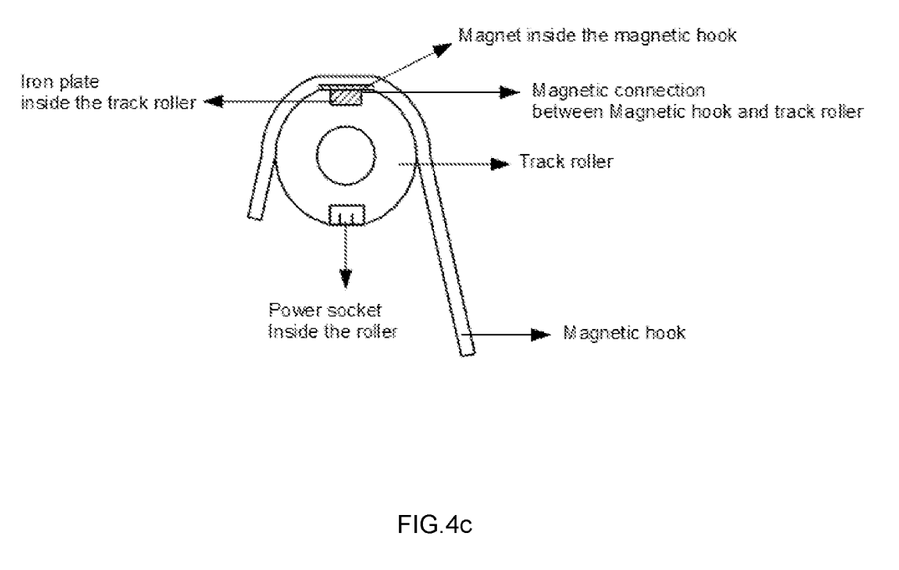
FIG. 4c shows a side view of power socket embedded in the track roller.

FIG. 4c shows another optional application where a compact power socket is embedded inside the magnetic track roller for connection with electric appliance.

Figure 5:
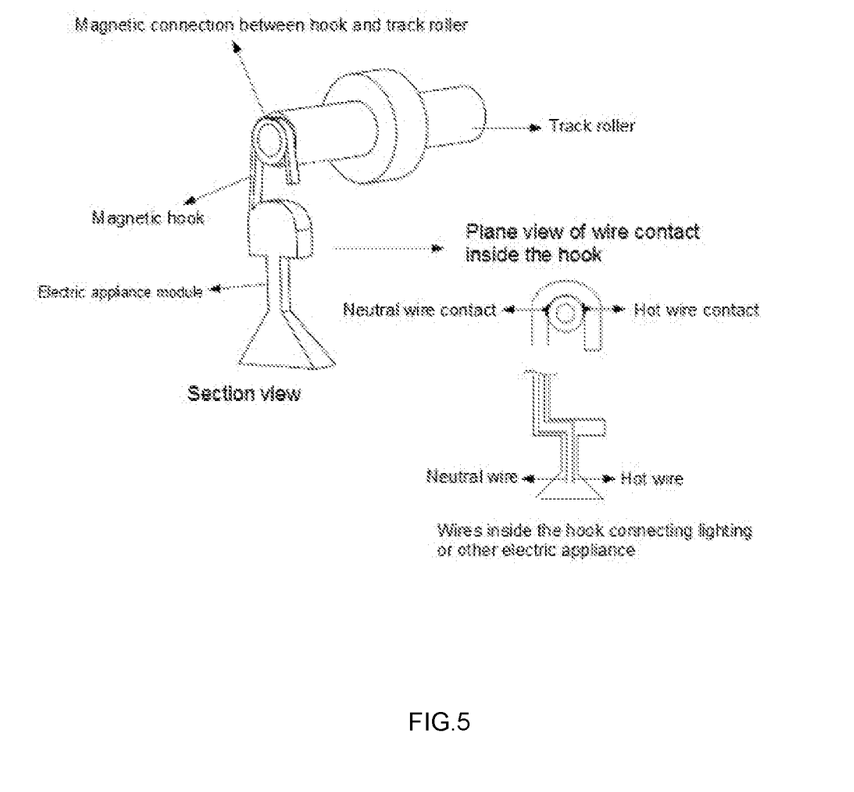
FIG. 5 shows a section view of magnetic connection between magnetic hook and track roller.
Figure 6:
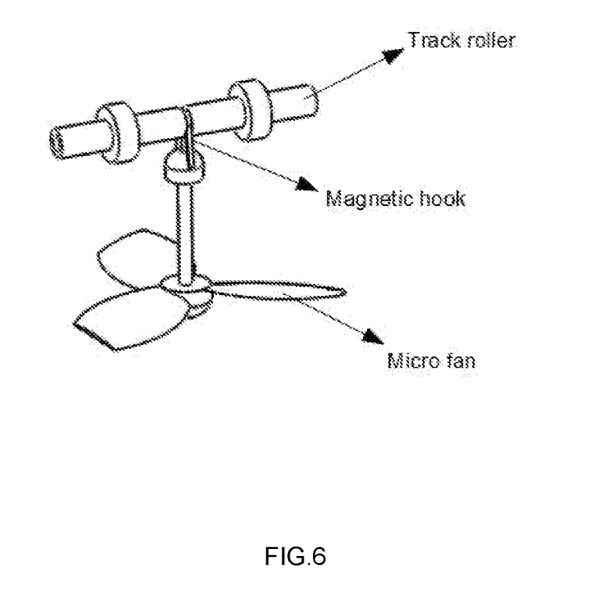
FIG. 6 shows a perspective view of magnetic connection between micro fan and track roller.
Figure 7:
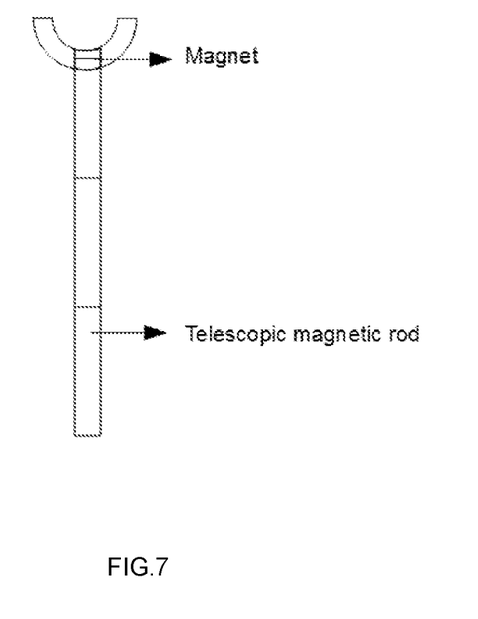
FIG. 7 shows a front view of a telescopic magnetic rod.

In FIG. 5, a detail section view shows magnetic connection between the hook and track roller. One end of electric wire of magnetic hook is in safe contact with the contact leaf of the track roller. Another end of electric wire of magnetic hook is extended to connect the electric appliance. FIG. 6 illustrates the application of magnetic connection between micro fan and magnetic track roller. In FIG. 7, a telescopic magnetic rod is used to control the track roller's movement on the track rail and hence help adjust the position of the track roller.

Figure 8:
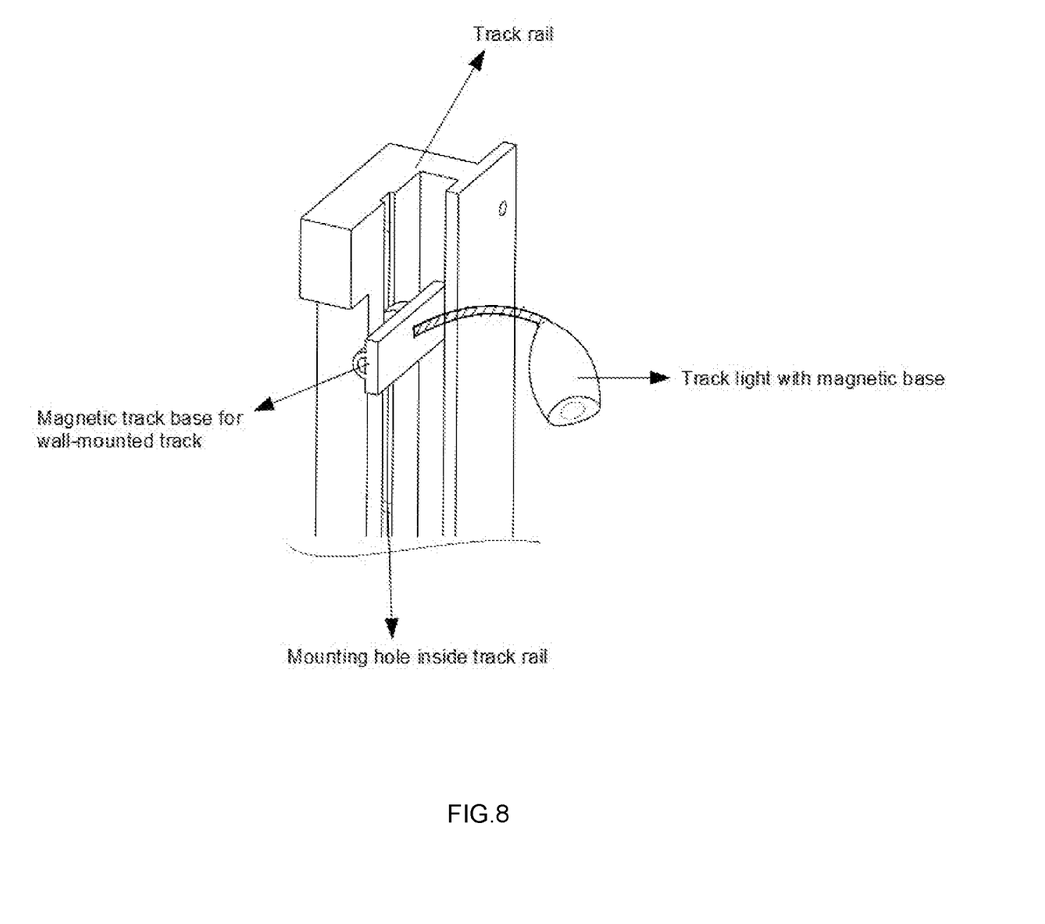
FIG. 8 shows a section view of an electric appliance module in the all-mounted track.
Figure 9:
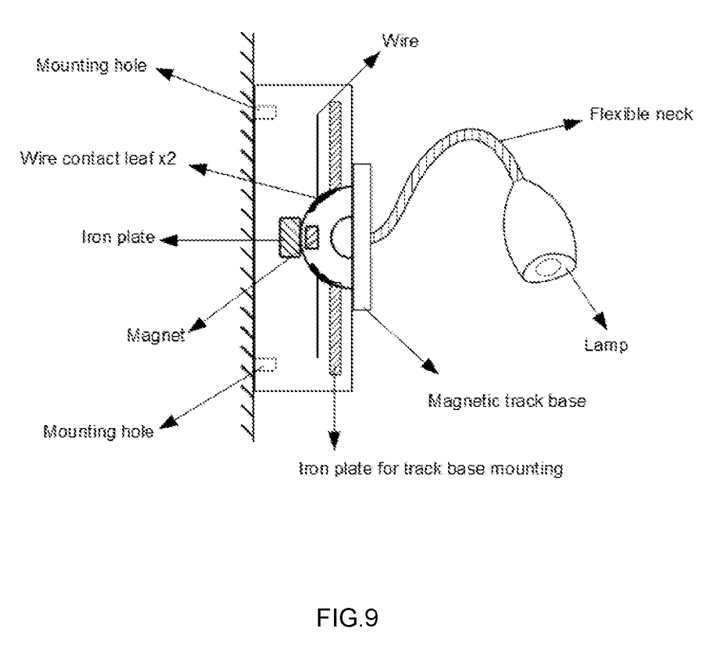
FIG. 9 shows an illustration of an electric appliance module in the wall-mounted track.
Figure 10:
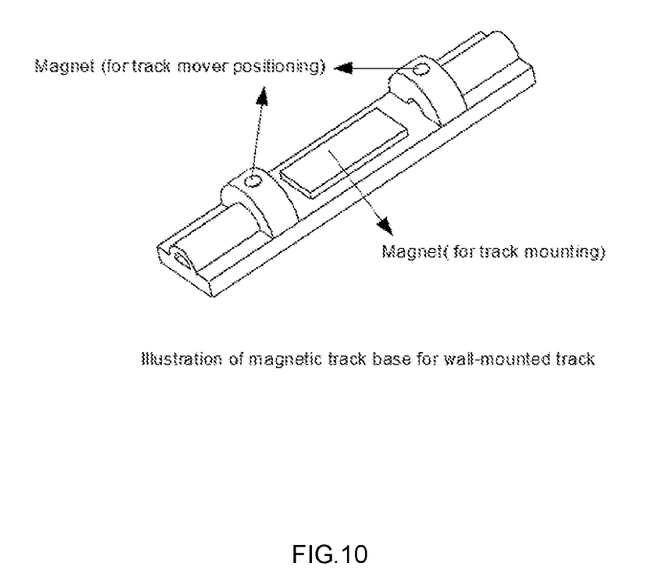
FIG. 10 shows the magnetic base of the appliance module for the wall-mounted track.

In the wall-mounting application, a special track mover with a magnetic base is used to connect the appliance module onto the track. FIG. 8 shows a section view of the connection between the track-based light module, which has a magnetic track base fitting onto the wall-mounted track. FIG. 9 shows the insertion of a light module with a magnetic base into the slot of the wall-mounted track. The magnetic attraction between the metal plate of the track and magnet in the track base helps fasten the light module into slot of the waft-mounted track. FIG. 10 shows the use of a magnetic base for positioning the appliance module onto the wall-mounted track.

REFERENCE

1. U.S. Pat. No. 3,801,951A, Oct. 24, 1972-Apr. 2, 1974. Thomas Industries Inc. Track light system.

2. U.S. Pat. No. 5,154,509A, Jan. 15, 1992-Oct. 13, 1992. 291 Inc. Low voltage magnetic track light system.

3. U.S. Pat. No. 8,348,492B2, May 6, 2008-Jan. 8, 2013. Koninklijke Philips N V. Movable LED track luminaries.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in each drawing. In the drawings.

What is claimed:

1. An electric track system comprising
a. a pair of track rails;
b. a plurality of track rollers;
c. a plurality of track movers;
d. a plurality of electric appliance modules;
wherein the electric appliance modules are connected to the track rollers or track movers which travel on the track rails;
wherein electric wires are embedded inside a magnetic hook.

2. The electric track system of claim 1, wherein the electric appliance module is connected to the track roller through a magnetic hook.

3. The electric track system of claim 1, wherein a track mover with a magnetic base is used for a wall-mounted track.

4. The electric track system of claim 1, wherein the track roller comprises two magnetic wheels.

5. The electric track system of claim 1, wherein electric wires are embedded inside the track rails for connection with the track roller.

6. The electric track system of claim 1, wherein the track roller conducts the electricity via contact points located inside the track slot.

7. The electric track system of claim 1, wherein electric wires are connected through the contact points on the magnetic wheels of the track roller.

* * * * *